Oct. 28, 1969　　　TAKAICHI MABUCHI　　　3,475,635
BRUSH MEANS FOR MINIATURE MOTORS
Filed June 28, 1967　　　　　　　　　　　　3 Sheets-Sheet 1

INVENTOR.
Takaichi Mabuchi
BY
Hill Sherman Meroni Gross & Simpson
ATTYS.

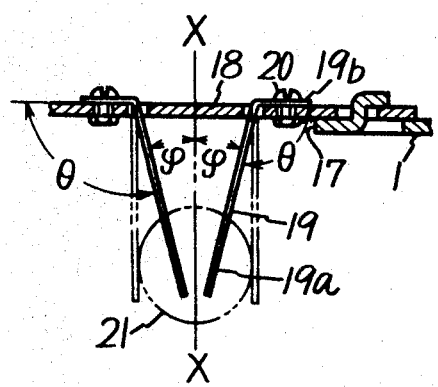
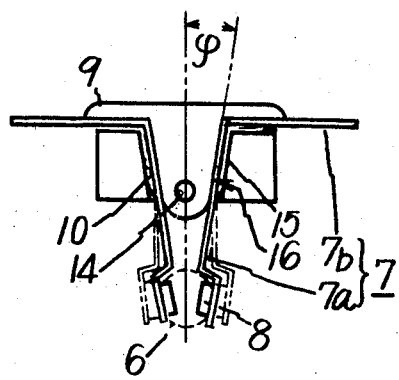
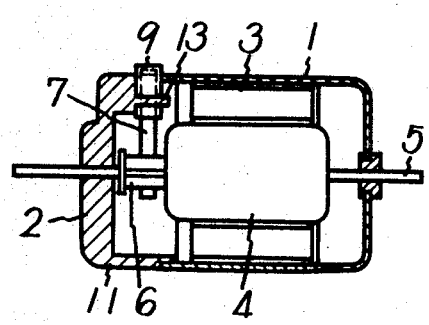
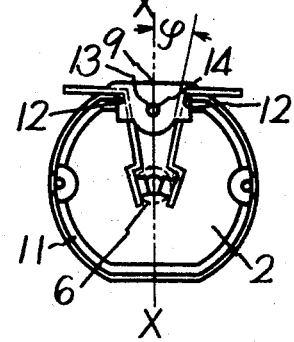

United States Patent Office 3,475,635
Patented Oct. 28, 1969

3,475,635
BRUSH MEANS FOR MINIATURE MOTORS
Takaichi Mabuchi, Tokyo, Japan, assignor to Tokyo Kagaku Kabushikikaisha, Tokyo, Japan, a corporation of Japan
Filed June 28, 1967, Ser. No. 649,598
Claims priority, application Japan, Dec. 22, 1966, 41/116,918, 41/116,919
Int. Cl. H02k $13/00$; H01r $39/18$, $39/38$
U.S. Cl. 310—238
3 Claims

ABSTRACT OF THE DISCLOSURE

Brush means for a miniature DC motor in which grooves are formed in a motor case cover and a brush is resiliently and detachably inserted into each groove and which is adapted such that the extending direction of the brush toward the commutator can be set as desired by the groove.

BACKGROUND OF THE INVENTION

Field of the invention

This invention relates to brush means for a miniature DC motor and more particularly to brush means which is designed such that a brush can easily be inserted detachably into each of grooves formed in the motor case cover without screwing down one end of the brush to the motor case cover.

Description of the prior art

In conventional types of miniature DC motors brushes are usually secured to the motor case by clamping means such as screws or the like, so that the contact pressure of the brushes with the commutator cannot be held constant at all times and uniform characteristics cannot be expected.

SUMMARY OF THE INVENTION

One object of this invention is to provide brush means for a miniature DC motor in which brushes can be detachably inserted into grooves formed in the motor case cover instead of being secured to the motor case by clamping means such as screws or the like.

Another object of this invention is to provide brush means for a miniature DC motor in which brushes are inserted into grooves formed in the motor case cover to hold the brushes at a predetermined angle to the commutator so that the contact pressure of the brushes on the commutator can be held constant as predetermined.

Other objects, features and advantages of this invention will become apparent from the following description taken in conjunction with the accompanying drawings.

BRIEF DESCRIPTION OF THE DRAWING

FIGURE 7 is a partial enlarged cross-sectional view illustrating one example of conventional brush means, for explaining this invention in comparison with the prior art;

FIGURE 8 is a cross-sectional view illustrating another example of the miniature DC motor employing the brush means of this invention;

FIGURE 9 is a back view of the motor case cover used in another example of the miniature DC motor employing the brush means of this invention; and FIGURE 10 is a front view illustrating still another example of the brush means of this invention.

DESCRIPTION OF THE PREFERRED EMBODIMENTS

Figure 1:
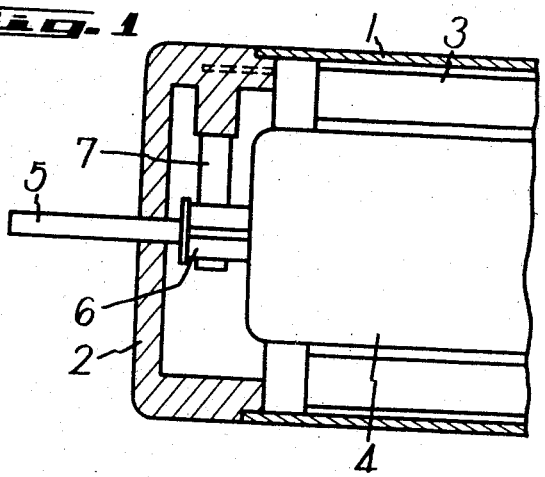
FIGURE 1 is a partial cross-sectional view schematically illustrating one example of a miniature DC motor employing brush means of this invention.

In order to facilitate a better understanding of the present invention, a description will be given in connection with brushes generally used in miniature DC motors for use with, for example, toys. In FIGURE 7 there is depicted a partial enlarged cross-sectional view schematically illustrating one example of the brushes employed in the prior art. That is, a rectangular aperture 17 is formed in the motor case 1 at, for example, the upper face thereof and a rectangular insulating mounting plate 18 is provided on the motor case 1 in a manner to cover the aperture 17. A pair of substantially L-shaped brushes 19 made of metal strips are secured to the mounting plate 18 by clamping means such for example as screws 20 and and the brushes 19 are disposed bilateral about the center line X—X in the lengthwise direction of the motor. The brushes 19 are adapted such that when they are not in contact with a commutator 21 of the rotor they assume such position at an angle $\theta$ as indicated by full lines in the figure and that when they are in engagement with the commutator 21 they lie in such positions as indicated by broken lines in the figure to vary the angle $\theta$ to provide a necessary contact pressure. Namely, the brushes 19 are each designed to form a predetermined angle $\psi$ with the center line X—X.

The brushes of such a construction can be mass-produced relatively easily without dispersion in the thickness, width and the angle $\theta$, and hence it is considered that the use of such brushes enables mass-production of DC motors having uniform characteristics without causing dispersion in the contact pressure of the brushes. However, even if such brushes having no dispersion in themselves can be obtained, the brushes cannot be always arranged to have the predetermined angle $\psi$ indicated by the full lines in FIGURE 7 due to the variations in the mounting of the brushes on the motor cases (in the illustrated example, the mounting conditions of the brushes 19 on the mounting plate 18 and those of the mounting plate 18 on the motor case 1) or distortions of the mounting plates themselves. This causes the variations in the contact pressure of the brushes in th individual finished DC motors.

A description will be given of one example of the present invention. In FIGURE 1 there is illustrated in cross-section one example of a motor produced according to this invention. Reference numeral 1 indicates a motor case made of a magnetic material and having a substantially U-shaped cross-section. A cover 2 made of, for example, a synthetic resin is assembled with the motor case 1 to cover the open and portion thereof. In this case pawls formed on the edge of the open end portion of the case 1 are bent into engagement with engaging recesses 2a of the cover 2. The motor case 1 houses a pair of magnets 3 and a rotor 4 in a rotatable manner. Reference numeral 5 designates a rotary shaft of the rotor 4 and 6 a commutator. Reference numeral 1 identifies a pair of substantially L-shaped brushes made of metal strips which are substantially the same as those depicted in FIGURE 7. The brushes are designed such that their free ends may contact with the commutator 6 directly or indirectly through contactors of carbon or the like mounted on the free ends, as illustrated in FIGURE 2.

Figure 2:
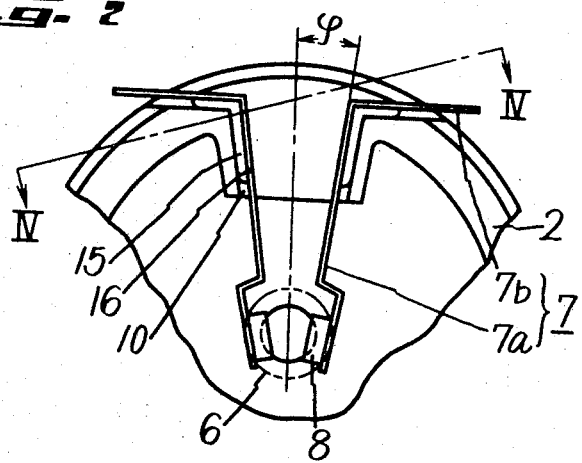
FIGURE 2 is a partial enlarged back view of a motor case cover having mounted thereon the brush means of this invention.
Figure 3:
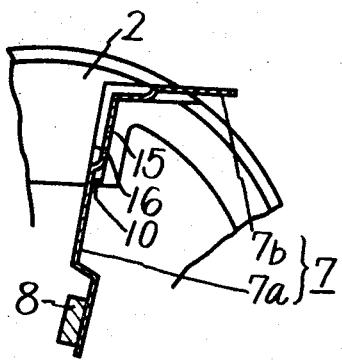
FIGURE 3 is an enlarged cross-sectional view illustrating one example of a brush usable in this invention.
Figure 4:
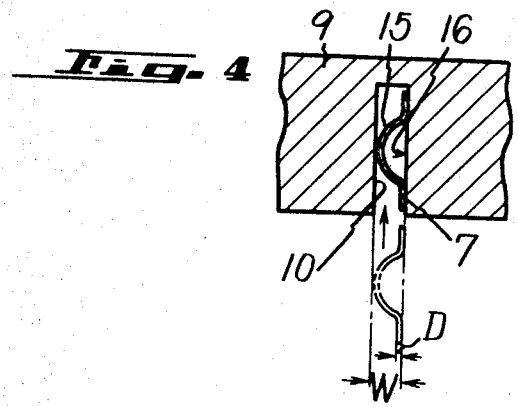
FIGURE 4 is a partial enlarged cross-sectional view taken along the line IV—IV in FIGURE 2.
Figure 5:
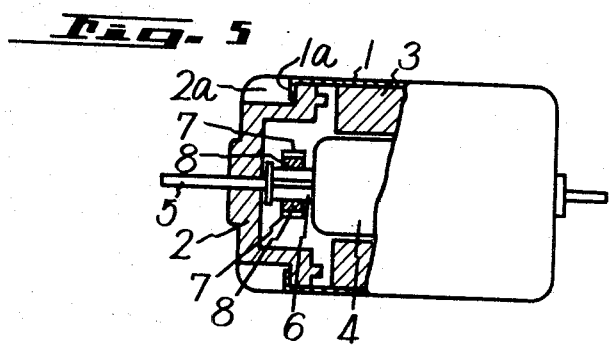
FIGURE 5 illustrates, partly in cross-section, the miniature DC motor of this invention, showing the manner in which the motor case and the cover are engaged with each other.
Figure 6:
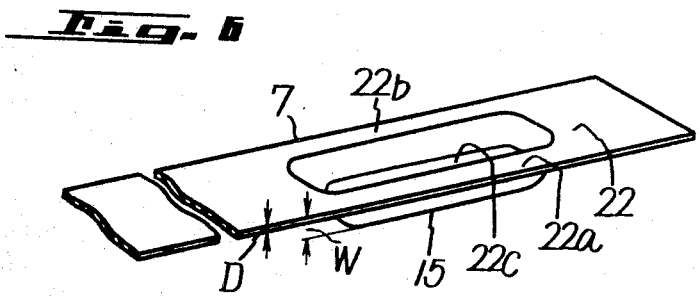
FIGURE 6 is an enlarged perspective view of the brush.

In accordance with this invention a substantially L-shaped groove 10 is formed in the cover 2 of the motor case 1, which has a wall 16 defining the extending direction of one arm 7a of the brush 7, as illustrated in FIGURE 2. Meanwhile, the brush 7 is formed in conformity with the L-shaped groove and a protrusion 15 is formed in the brush 7 in its lengthwise direction. The brush 7 thus formed is fitted into the aforementioned groove 10, as clearly shown in FIGURE 2. In this case the wall 16 of the groove 10, which is opposite to that with which the protrusion 15 of the brush 7 makes contact, serves to define the extending direction of the arm 7a of the brush 7 when the brush 7 is not in contact with the commutator 6. The protrusion 15 of the brush 7 can be formed circular in cross-section as illustrated in FIGURE 4, namely an intermediate portion 22c between marginal portions 22a and 23b of the brush 7 is depressed from the level of a face 22 as clearly shown in FIGURE 6 and the brush 7 makes contact with the wall 16 of the groove 10 at 22, 22a and 22b. This facilitates insertion of the brush 7 into the groove 10 and ensures engagement of the brush 7 with the groove 10 by resiliency of the protrusion 15.

FIGURES 8, 9 and 10 illustrate an example in which the aforementioned grooves 10 are formed in a brush holding piece 9 designed to be detachable from the cover 2. That is, a notch 12 is formed in a flange 11 of the cover 2 and a pin 13 is planted on the cover 2 integrally therewith in the notch 12 at a position lying on the center line X—X. The brush holding piece 9 is formed in conformity with the shape of the notch 12 and an aperture to be engaged with the aforementioned pin 13 is bored in the brush holding piece 9 to make it detachable from the cover 2. Further, a pair of grooves 10 such as mentioned above are formed in the brush holding piece 9 on its contact face with the cover 2 of the brush holding piece 9 symmetrically with respect to the center line X—X, and the brush holding piece 9 is adapted to be held between the cover 2 and the case 1 when they are assembled and the free end of the arm 7b of the brush 7 is led out for external connection. The brush holding piece 9 may be made of a heat-proof resin such, for example, as commercially known under the name of "Delrin," while the cover 2 may be formed from an inexpensive resin, for example, styrene or the like.

With such an arrangement as has been described above, the protrusion 15 of the brush 7 provided at the bent portion thereof ensures resilient and firm holding of the brush 7 in the groove 10, and hence the arm 7a of the brush 7 can be accurately engaged with the guide wall 16 of the groove 10. This ensures the arm 7a of the brush 7 to extend along the guide wall 16. Further, since the inclination of the guide wall 16 or the angle $\psi$ described with FIGURE 7 can be precisely selected to be of a desired value during manufacturing processes of the brush holding piece 9, the extending direction of the arm 7a of the brush 7 can be selected to have the predetermined angle $\psi$. In addition, there is no possibility of causing the variations in the angle $\psi$ during or after the assembling operation of the brush means, so that no variations are caused in the contact pressure when the brush is engaged with the commutator 6. That is, this invention enables mass-production of the motors having substantially uniform characteristics.

Although the thickness D of the brush 7 is practically very small, it is impossible in the making of the brush holding piece 9 to make the width W of the groove 10 as narrow as the thickness D of the brush 7. However, this invention avoids necessity of narrowing the groove 10 so much but ensures engagement of the brush 7 with the groove 10, and hence this invention also facilitates fabrication of the brush holding piece 9.

Further, in accordance with this invention the brush 7 can be firmly held in the groove 10 only by inserting it into the groove, namely this facilitates easy replacement of the brush. In the prior art the brush is fixed by means of screws, eyelets, rivets 20 or the like as shown in FIGURE 7 and consequently replacement of the brush is very troublesome. Further, in the conventional brush means the pair of brushes 19 are secured to the mounting plate 18 in planted condition as illustrated in FIGURE 7 and the brushes 19 are readily bent while handling, so that the angle $\theta$ is likely to vary. According to this invention, however, the pair of brushes 7 are attached to the brush holding piece to extend along the plane defined by the cover 2 or the holding piece 9, and accordingly this invention eliminates the aforementioned disadvantages experienced in the prior art.

It will be apparent that many modifications and variations may be effected without departing from the scope of the novel concepts of this invention.

I claim as my invention:
1. A miniature DC motor comprising:
a motor case housing at least a pair of magnets;
a rotor rotatably mounted within said case;
a commutator supported for corotation with said rotor;
cover means removably attached at an end of said motor case adjacent said commutator and overlying said commutator;
at least a pair of brush means each said brush means formed in an L-shaped configuration and having an arm portion contacting said commutator;
said cover means having grooves individually mounting each said brush means and each said groove having an L-shaped configuration complementary to the configuration of said brush means and having a guide wall portion contacting a surface of said arm portion and extending inwardly of said commutator to define a predetermined extending direction of said arm portion relative to said commutator;
means forming a resilient protrusion on each said brush means extending oppositely of said surface contacting said guide wall and sized to resiliently hold said brush means in said groove and to urge said surface into contact with said guide wall portion.
2. The motor of claim 1 further characterized by:
each said brush means having a second arm portion disposed obliquely of said first mentioned arm portion and extending substantially parallel of a diametral axis of said commutator;
each said groove having a second guide wall portion disposed parallel of the diametral axis of said commutator and spaced therefrom a certain distance and contacting a surface of said second arm portion;
means forming a second resilient protrusion on each said brush means extending opposite of said surface contacting said second guide wall portion and resiliently urging said surface of said second arm portion into contact with said second wall portion to positively position extent of said first arm portion of each said brush means relative to said commutator.

3. The motor of claim 1 wherein said cover means include:
a cover member; and
a brush holding member detachably carried by said cover member and having said grooves formed therein for mounting said brush means.

References Cited

UNITED STATES PATENTS

| | | | |
|---|---|---|---|
| 1,960,470 | 5/1934 | Whiteside | 310—239 |
| 2,379,176 | 6/1945 | Mulheim | 310—239 |
| 2,421,947 | 6/1947 | Lear | 310—242 |
| 3,045,137 | 7/1967 | Simmons | 310—239 |
| 3,234,420 | 2/1966 | Lindner | 310—248 |
| 3,296,473 | 1/1967 | Mabuchi | 310—239 |

ORIS L. RADER, Primary Examiner

LESTER L. HEWITT, Assistant Examiner

U.S. Cl. X.R.

310—239, 242, 248